Oct. 24, 1933.                A. WEILL                1,931,683
JOKE BUZZER
Filed Feb. 23, 1933

Inventor:
Albert Weill

Patented Oct. 24, 1933

1,931,683

UNITED STATES PATENT OFFICE 1,931,683

JOKE BUZZER

Albert Weill, Nuremberg, Germany

Application February 23, 1933, Serial No. 658,134, and in Germany January 25, 1933

2 Claims. (Cl. 272—27)

My invention relates to an improvement of the mechanical joke buzzer, described by Letters Patent No. 1,845,735, in such a manner that instead of the known locking lever adapted to coact with the buzzer lever, a slide member is arranged within a box-shaped casing. The outer end of said slide member projects through an opening of the casing and is formed as a constituent part fitted to apparently serve for opening the casing. With the intention to open the casing, a pressure is exerted on the projecting part of the slide member, this member being moved within the casing in such a manner that the buzzer lever is released.

My invention is shown by way of example in the annexed drawing, in which

Figure 1:
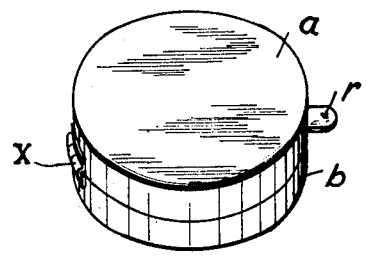
Figure 2:
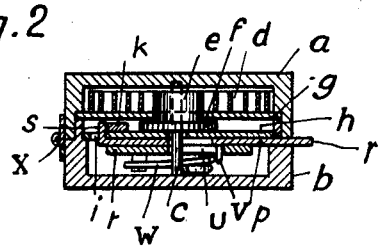
Figure 3:
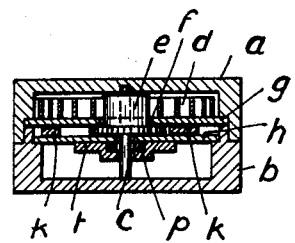
Figure 4:
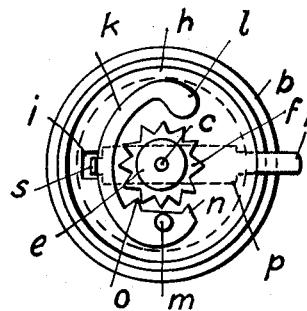

Fig. 1 is a perspective view of the casing,

Fig. 2 a vertical longitudinal section,

Fig. 3 a similar section turned 90 degrees,

Fig. 4 a plan view with upper casing section being taken away, and

Figure 5:
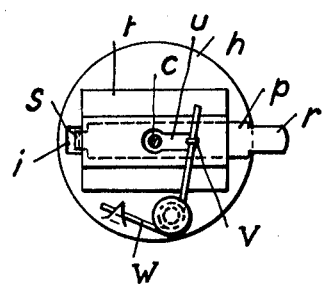

Fig. 5 a detail view.

The cup-shaped casing sections $a$ and $b$ forming a box, are relatively rotatable about the coaxial rivet $c$. The spring $d$ is situated within the upper section casing $a$ and engages with its inner end the spindle $e$ supported by the coaxial rivet $c$. Said spindle is provided with the toothed wheel $f$, the spring $d$ being held in position by the carrying member $g$. Hitherto, the contrivance is the same as described in Letters Patent No. 1,845,735.

According to my invention, a disk member $h$ is arranged within the lower casing section $b$ which supports on its underside a slide member $p$ projecting with its outer end $r$ through an opening of the casing. The disk member $h$ is provided with a slot $i$ through which the inner end of said slide member is projecting in the form of a locking nose $s$ coacting with the buzzer lever $k$. Said buzzer lever is pivotally mounted, as hitherto known, between its ends at $m$ on the disk member $h$ and, having two teeth $n$ and $o$, to engage the wheel $f$, so that upon rotation of said wheel the buzzer lever $k$ is oscillated.

The slide member $p$ being provided with a slot in its middle part for passing the rivet $c$ is supported on the under side of the disk member $h$ by means of a guide $t$ and carries a pin $v$, against which rests a spring $w$ placed on the under side of the disk member $h$. The guide $t$ has a slot $u$, through which the coaxial rivet $c$ passes and the pin $v$ moves. On the upper side of the disk member $h$ the buzzer lever $k$ is journaled.

On the outside at $x$ of the lower casing section $b$ an imitated hinge is fitted to give the appearance that the two casing sections are movably connected.

The driving spring $d$ is wound by rotating the two casing sections $a$ and $b$ against one another about the coaxial rivet $c$, as hitherto known. The slide member $p$ carrying the pin $v$ is held by the arm of the spring $w$ in such a position that its outer end $r$ projects beyond the casing as shown in Fig. 1. This projecting end $r$ of the slide member $p$ represents a constituent part of the whole and serves for opening the casing by pressing upon it. Thereby the locking nose $s$ on the inner end of the slide member $p$ holds the buzzer lever $k$ in its locking position.

With the intention to open the casing a pressure by hand is exerted upon the projecting end $r$, and the slide member $p$ is moved in such a manner that the locking nose $s$ releases the buzzer lever $k$, whereby the vibrating operation of the latter by rotation of the toothed wheel is obtained. Terminating the pressure upon the projecting arm the slide member $p$ returns to its normal position, owing to the influence of the spring $w$, and the locking nose $s$ causes again the stopping of the buzzer lever $k$.

Having now fully described my invention, what I claim is:

1. A joke buzzer consisting of a casing with two relatively rotatable sections including a spring actuated buzzer lever and a locking member to control operation thereof, comprising a slide member projecting laterally through the casing to form a constituent part of the whole, a locking nose formed at the inner end of said slide member to engage with said buzzer lever and a spring for actuating said slide member to cause engagement with said buzzer lever and to move said slide member outwardly through the casing.

2. A joke buzzer consisting of a casing with two relatively rotatable sections including a spring actuated buzzer lever and a locking member to control operation thereof, comprising a disk member arranged with the lower casing section, a slide member projecting laterally through the casing member being arranged on the underside of said disk member, a spring for actuating said slide member to cause engagement with said buzzer lever, a guide mounted on the underside of said disk member to receive said slide member, a slot provided in said disk member and a locking nose formed at the inner end of said slide member to project through said slot and to engage with said buzzer lever.

ALBERT WEILL.